(12) United States Patent
Whinnery (10) Patent No.: US 9,595,251 B2
(45) Date of Patent: Mar. 14, 2017

(54) SOUND PLACEMENT OF COMFORT ZONES (71) Applicant: Honda Motor CO., LTD., Tokyo (JP)

(72) Inventor: Joseph Whinnery, Scotts Valley, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 69 days.

(21) Appl. No.: 14/707,924

(22) Filed: May 8, 2015

(65) Prior Publication Data
US 2016/0329040 A1 Nov. 10, 2016

(51) Int. Cl.
G10K 11/16 (2006.01)
H03B 29/00 (2006.01)
G10K 11/178 (2006.01)

(52) U.S. Cl.
CPC ................. G10K 11/178 (2013.01)

(58) Field of Classification Search
CPC . B60R 11/02; B60R 11/0217; B60R 11/0247; G06F 3/16; G10L 15/20; H04M 1/04; H04M 1/58; H04M 1/62; H04M 9/00; H04M 9/08; H04R 5/023; H04R 5/02; H04R 3/02; H04R 3/04; H04R 3/06; H04R 3/08; H04R 3/14; H04R 3/007; H04R 5/04; H04R 25/453; H04R 25/50; H04R 25/505; H04R 25/507; H04B 1/082; H04N 13/0214; H04N 13/0217
USPC ......... 381/28, 59, 55, 317, 318, 321, 74, 72, 381/73.1, 26, 56, 57, 71.1–71.13, 83, 332, 381/93, 96, 97, 98, 99, 100, 101, 102, 103, 381/106, 107, 108, 120, 121, 86, 302; 700/94; 348/47
See application file for complete search history.

(56) References Cited

U.S. PATENT DOCUMENTS

| | | | |
|---|---|---|---|
| 5,559,893 A | 9/1996 | Krokstad et al. | |
| 6,820,897 B2 | 11/2004 | Breed et al. | |
| 7,853,026 B2 | 12/2010 | DeLine et al. | |
| 8,160,264 B2 | 4/2012 | Itou et al. | |

(Continued)

FOREIGN PATENT DOCUMENTS

| | | |
|---|---|---|
| DE | 102006016593 | 10/2007 |
| JP | 2006023588 | 1/2006 |
| JP | 2006266375 | 10/2006 |

OTHER PUBLICATIONS

Lee, "Objective Evaluation of Interior Sound Quality in Passenger Cars During Acceleration", Journal of Sound and Vibration, 2008, 149-168, vol. 310.

(Continued)

Primary Examiner — Leshui Zhang
(74) Attorney, Agent, or Firm — Kramer Amado P.C.

(57) ABSTRACT

Various exemplary embodiments relate to a device for noise cancelling using a method of updating a noise cancelling distribution area. The device may include: a memory; a processor configured to: measure a location of a user's head; measure an acoustic environment surrounding the user; determine active noise reduction controller configuration parameters for a noise cancelling distribution area; generate at least one active noise reduction control from the active noise reduction controller configuration parameters; and apply the at least one active noise reduction control creating the noise cancelling distribution area in a region around the user's head or ear.

18 Claims, 5 Drawing Sheets (56) References Cited

U.S. PATENT DOCUMENTS

| | | |
|---|---|---|
| 8,542,844 B2 | 9/2013 | Bowden et al. |
| 2002/0076059 A1 | 6/2002 | Joynes |
| 2009/0058633 A1 | 3/2009 | Luo et al. |
| 2010/0027805 A1* | 2/2010 | Itou ..................... G10K 11/178 |
| | | 381/71.12 |
| 2010/0104110 A1 | 4/2010 | Asao et al. |
| 2010/0111317 A1 | 5/2010 | Asao et al. |
| 2011/0075860 A1 | 3/2011 | Nakagawa et al. |
| 2012/0230504 A1 | 9/2012 | Kuroda |
| 2014/0112490 A1* | 4/2014 | Caillet ............... G10K 11/1784 |
| | | 381/71.4 |

OTHER PUBLICATIONS

Rafely, et al., "H2/H8 Active Control of Sound in a Headrest: Design and Implementaion", IEEE Transactions on Control Systems Technology, 1999, 79-84, vol. 7 Issue 1.

* cited by examiner

SOUND PLACEMENT OF COMFORT ZONES

TECHNICAL FIELD

Various exemplary embodiments disclosed herein relate generally to noise cancelling and more specifically, tracking of regions for noise cancelling.

BACKGROUND

Active Noise Reduction (ANR) is sometimes called Active Noise Cancellation. By determining the characteristics of sources of linear acoustic energy, and the sound field which exists in a region of space which has a linear relationship to the source acoustic field, the complex temporo-spatial acoustic field at the measurement point (such as the position of a person's ear) may be modified with an acoustic field which is 180 degrees out of phase from the source field. Thus the total amplitude of the sound field experienced at the ear point is reduced.

SUMMARY

Various embodiments relate to a method of updating a noise cancelling distribution area, the method including: measuring a location of a user's head; measuring an acoustic environment surrounding the user; determining active noise reduction controller configuration parameters for a noise cancelling distribution area; generating at least one active noise reduction control from the active noise reduction controller configuration parameters; and applying the at least one active noise reduction control creating the noise cancelling distribution area around the user's head or ear Various embodiments are described including a device for noise cancelling using a method of updating a noise cancelling distribution area including: a memory; a processor configured to: measure a location of a user's head; measure an acoustic environment surrounding the user; determine active noise reduction controller configuration parameters for a noise cancelling distribution area; generate at least one active noise reduction control from the active noise reduction controller configuration parameters; and apply the at least one active noise reduction control creating the noise cancelling distribution area in a region around the user's head or ear.

BRIEF DESCRIPTION OF THE DRAWINGS

In order to better understand various exemplary embodiments, reference is made to the accompanying drawings, wherein.

To facilitate understanding, identical reference numerals have been used to designate exemplary elements having substantially the same or similar structure and/or substantially the same or similar function.

DETAILED DESCRIPTION

A user's ability to reduce the amplitude of a sound field in ANR may be limited, and when an area of reduction is large, the actual reduction in the sound pressure level is not as significant as when the target volume area of reduction is small. In addition, a total number of frequencies which may be reduced in a space is dependent on the wavelength which may fit in that space. So, the smaller the space targeted for ANR, the greater the total sound reduction may be in that specific location. Therefore, by dynamically tracking the location of a user's ear, for example, the reduction of sound at that location may be made greater (it is quieter) and the quiet experience does not change when the user changes the position (or pose) of their head.

ANR techniques may be localized for more effective performance. In some embodiments, smaller volumes of ANR may be used to accomplish better sound reduction. For example, around the head of a driver or passenger of an automobile. Specific tones may be introduced at different frequencies for specific noise control in zones of comfort. When using these smaller zones, however, users may frequently move around, causing inaccuracy and disturbances in the reading and noise control. There exists, therefore, a desire for accurate dynamic detection of movement of a user and to dynamically shift the position of the noise reduction zone to follow the user.

Figure 1:
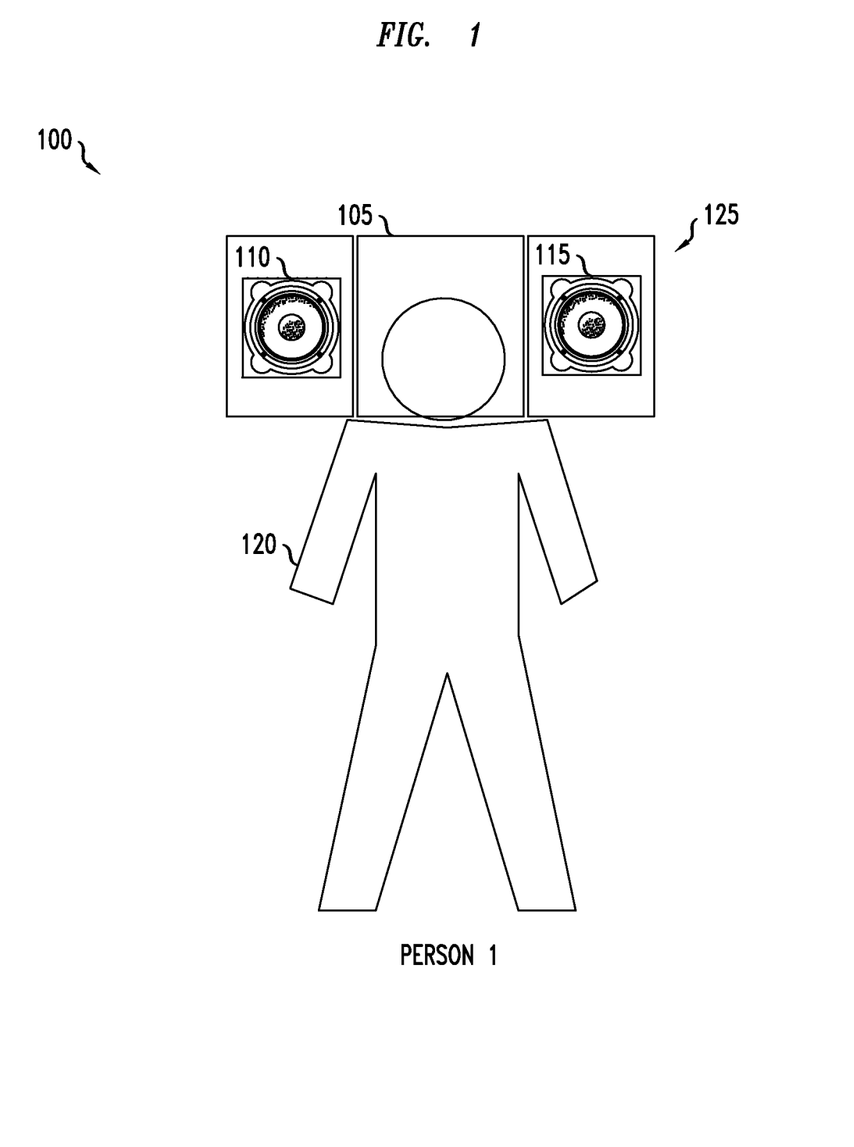
FIG. 1 illustrates an exemplary user environment in accordance with one aspect of the present disclosure.

FIG. 1 illustrates a user environment 100. User environment 100 includes head rest area 105, speakers 110 and 115, and noise cancellation system 125. User environment 100 may include a noisy environment where a user 120 may sit, stand, or lie down. Examples may include a car, an airplane, a train, a home recliner, or a stationary lounge in an airport. Other examples may exist and should not be limited to those described herein.

User environment 100 may include head rest area 105. Head rest area 105 may include a pillow or cushioned head rest. Similarly, the head rest area 105 may include audio equipment and electronics embedded for sensing the environment or for feedback for noise cancellation. For example, head rest area may have one or more microphones, and/or accelerometers. These components, may work with each other to sense, detect and modify the user environment 105 for maximized noise cancelling abilities. For example, the microphones may detect sound, while speakers 110 and 115 may be used to cancel noise. In some embodiments head rest area 105 may be adjustable. In other embodiments, speakers, microphones or other components within head rest area 105 may be adjustable.

Speakers 110 and 115 may include a device which converts an electrical signal into a sound. Additional speakers may be placed around the user to provide noise cancellation. For example, one speaker may be used for high frequency sounds, one speaker for mid range frequency sounds, and one speaker for low frequency sounds. In another embodiment, one speaker may be used which includes abilities for attenuating all frequency ranges. Similarly, speakers may be placed at points surrounding a user's 120 head, above, below, behind and to the side such that optimal noise cancellation may be achieved. Such speakers may also be in the head rest or on other structures near the user, for example, in an automobile, on the dash, in the door, or on the interior roof.

User 120 may include multiple sizes of individuals such as a child, a teenager and an adult. For example, user 120 may sit lower or the user 120 may sit higher such as a tall individual and the noise cancellation environment 125 may have to compensate by adjusting parameters in software to effectively shift the speakers in the environment and/or by moving the area of targeted noise reduction.

Noise cancellation system 125 may include several kinds of equipment including speakers, microphones, accelerometers, processors, memory, or embedded circuits and sensors which enable detection of sound and noise cancellation thereof. Noise cancellation system 125 may include projection of a noise cancellation environment for user 120 in the shape of a bubble, sphere, square, rectangle, triangle, polygon, or conical shape such that the environment may be optimized.

Figure 2:
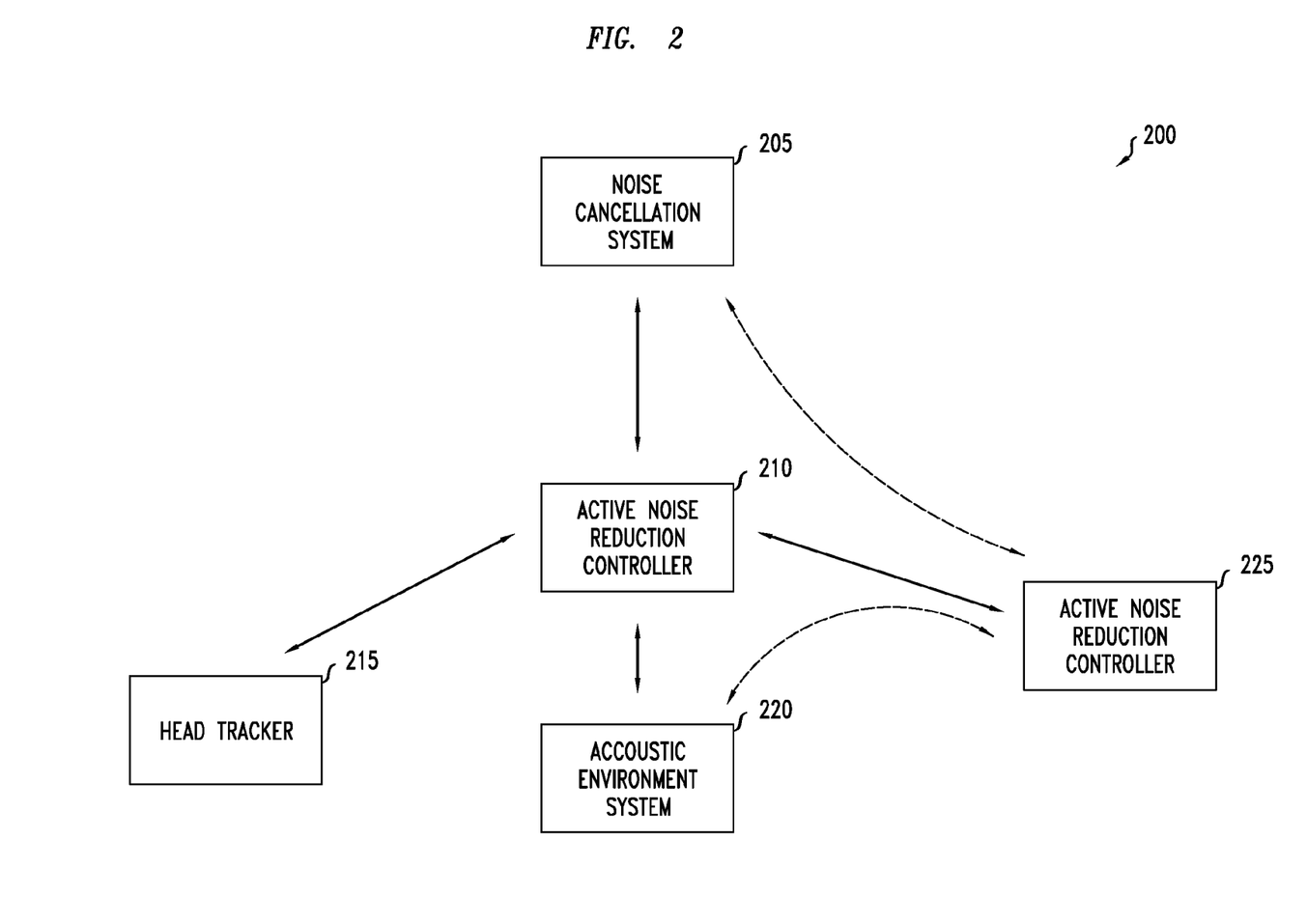
FIG. 2 illustrates an embodiment of a system for noise reduction.

FIG. 2 illustrates an embodiment of a system 200 for noise reduction. Embodiment of system 200 may include a noise cancellation system 205, controller 210, head tracker 215, acoustic environment system 220, and active noise reduction controller 225. Fewer or more components may be provided within the system 200, for example, acoustic environment system 220, head tracker 215 and active noise reduction controller 225 may be combined in one microchip.

Head tracker 215 may determine the user's 120 head location using any of a variety of systems or processes known in the art. Head tracker 215 may track a user's head. Head tracker 215 may use various types of sensors to track the users head such as a 2-dimensional (2D) or 3-dimensional (3D) camera, accelerometers, infrared, ultrasonic, radar, electrostatic, evanescent, lidar, lasers or other location/position sensing means. Head tracker 215 includes processes to calculate head position based on input from sensors. In some embodiments, head tracker 215 may use algorithms such as smooth pose estimation, ear axis tracking, and facial recognition algorithms. These algorithms may similarly be implemented or processed in controller 210.

Head tracker 215 may use pose estimation mechanisms where the users head or body orientations are identified. Pose estimation may use iterative closest point algorithms, for example. Correspondences between 2D images and features on 3D curve or point clouds may be mapped. In one example, projection rays may be reconstructed from image points. Points nearest to each projection ray may be determined on a 3D contour. A pose may be estimated, and tracked using the contour and the correspondence set. Occlusion algorithms may similarly be used. Similarly, poses may be defined by rotation and translation transformations and data collected by the 2D or 3D cameras, infrared light (for dark conditions), or ultrasound.

In some embodiments, facial positioning may be recognized by identifying location of the ears, nose, eyes, and/or mouth. Tracking may be done using algorithms such as Principal Component Analysis using eigenfaces, Linear Discriminate Analysis, Elastic Bunch Graph Matching, and Multilinear Subspace Learning using tensor representation.

In one embodiment, head tracker 215 may use the axis of the user's ears to track the head. For example, two cameras may be used to identify one ear each, and respectively the cameras may track the movement of the head by continuously updating the location of the ear axis. A plane with surface normal parallel to the direction of the gaze may be calculated and continuously or periodically updated for tracking the ear axis. In another embodiment, head tracker 215 may determine the head size and track the head's motion. By dynamically tracking the position of the passenger ear point, the noise cancellation system may focus the sound reduction to the smallest volume around the ears. The system may keep it there by adjusting the center position of the sound reduction region to follow the ears, so that even if the passenger leans forward, turns around, or looks out the side window, the placement of the noise reduction region experienced by the passenger remains highly consistent.

Acoustic environment system 220 may include one of a number of sensors or devices including microphones, accelerometers and micro-sensors used for measuring the acoustical environment. For example, one microphone may be dedicated to detect sound at certain frequencies, or of a certain type such as speech. Similarly, another microphone or the same microphone may be used to detect sudden noises such as cars passing by, or weather changes. In another embodiment, accelerometers may be used to detect vibrations in a body of a vehicle that produces sound energy.

Acoustic environment system 220 may provide sound data to controller 210 and/or active noise reduction controller 225. Acoustic environment system 220 may digitize the signals for use by controller 210 and include Digital Signal Processor(s) (DSP). In some embodiments, sounds from acoustic environment system 220 may go directly to active noise reduction controller 225. Road noise may be detected, for example. Similarly talking or a passing noise such as an emergency vehicle may be known as one type of noise.

In one embodiment, one microphone may be placed to the left and one to the right of the user. Similarly, a microphone may be placed outside of a moving vehicle to more accurately detect ambient noises. In another embodiment, a user may be able to interact with system 200 and modify the sensor placement and accuracy. In another embodiment, a user may be able to calibrate the system upon initialization or first time use. In another embodiment a combination of one or more microphones and/or calibrations may be used together. A user may be able to move a sensor microphone around a car cabin, for example, and see how coherence changes for different frequencies in real-time.

Active noise reduction controller 225 may include any control system which may create and update noise reduction zones. Active noise reduction controller 225 may take acoustic data, perform calculations on it to determine the sound waves preferred to create the sound reduction zone at a specific location. Noise reduction zones may include a variety of shapes such as a sphere, square, rectangle, bubble, triangle, polygon, or conical shape. Active noise reduction controller 225 may include any of a variety of filters or filter parameters for determining the noise reduction zone. The filter parameters, for example, may be first order, second order or third order, and so on. In this example, the coefficients may be modified based upon inputs from the controller 210. Different filters may be used and updated for different frequency ranges. For example, low pass, high pass or linear filters may be used. Active noise reduction controller 225 may account for noise by amplitude and phase shifting signals to counter noise types which are being detected.

Active noise reduction controller 225 may produce signals for speakers that create noise reductions zones. Calculations may be based upon location of the sensors which measure the frequency, magnitude, and temporo-spatial parameters of the structure-borne and air-borne acoustic waves (noise) which have a known coherence to the sources which produced the noise and the calculations and are further based upon the measured linear relationship of the speakers relative to the location of the noise reduction zone and the sensors for measuring noise in the environment. This kind of noise reduction may be effective for cancelling specific frequencies with high coherence between the source of the noise and the sensor which measures the noise. Furthermore, the coherence of the measured sound field may change as the position of the passenger's head changes, or as the shape of the cabin acoustic environment changes. In one embodiment, the filter parameters may be updated first by the change in the position of the user, then by the change in the cabin acoustic characteristics, followed by the change in the user position. In this way, the filter parameters are updated based on the motion of the user, and by the changes in the cabin acoustic environment, block. The changes in the environment may be measured by producing a characteristic waveform from the speakers, and then measuring the result with the sensors. In this way, the environment may be continuously monitored and noise reduction area parameters modified so as to produce a consistent performance in the noise reduction area. In other embodiments, the filter parameters may be updated based upon the motion of the user and the changes in the cabin acoustic environment independent of one another.

Noise cancellation system 205 may include equipment used to cancel noise. Noise cancellation system 205 may include one or more speakers which output sound to reduce noise. Similarly, noise cancellation system 205 may include amplifiers and drivers to output the appropriate noise cancelling frequencies and amplitudes of sounds. Location of speakers may typically reside in the head rest but may be placed elsewhere as described above.

Controller 210 may be used to control system 200. Controller 200 may receive inputs and then control formation and maintenance of a noise reduction zone. Controller 210 may be used to communicate with any or all of noise cancellation system 205, head tracker 215, acoustic environment system 220, and active noise reduction controller 225. Controller 210 may be used to update data in active noise reduction controller 225 at different or variable rates.

Controller 210 may receive information from head tracker 215 and/or acoustic environment system 220. Controller may include a processor, memory or other computational devices to analyze and store data received. For example, controller may receive and store head tracking information from head tracker 215. Controller 210 may determine head positions and/or motions of the head. Controller 210 may account for inertia of the head or body, as well as torsional stiffness. The controller may receive position data from head tracker 215 or may process data from head tracker 215 to determine location.

Controller 210 may match observed movement with a defined profile. Two examples of profiles of movement include stationary and moving. In one example, a user may be bending over to pick up a blanket where controller 210 may indicate to active noise reduction controller 225 to change parameters for such a drastic location change. In another embodiment, controller 210 may decide that a smaller shift such as a head roll should not be used to change parameters. Profiles may be identified and utilized in order to efficiently adjust the sound reduction zone.

Active noise reduction controller 225 may be updated by controller 210 at variable update rates, dependent on the motion of the passenger's head and the profiles. For example, an appropriate update rate range may be in the range of 30 milliseconds to 150 milliseconds for rapid head motions, or between 0.5 seconds to 2 seconds. When a user's head is down, an update may be paused until the head returns to its original location. Similarly, if the user's head is moving very little, such as sleeping, the update rate may be low. In another example, when user's head is moving, for example when they are speaking to someone or when they are viewing moving traffic, the update rate may be higher.

Controller 210 may also receive acoustic data from acoustic environment system 220. Controller 210 may receive continuous acoustic data at a certain rate and update the sound reduction zone accordingly through active noise reduction controller 225. Controller 210 may continuously determine frequency, amplitude and position changes at a rate of between 0.5 and 5 Hertz for example. Controller 210 may make and determine continuous modifications that need to be made to configuration parameters which are sent to active noise reduction controller 225 and/or noise cancellation system 205. The configuration parameters may be updated at different rates, for example between 0.5 and 5 Hertz.

Controller 210 may calculate or orchestrate different relevant types of information for initialization. For example, controller 210 may receive data from head tracker 215 and communicate with active noise reduction controller 225 to determine whether the configuration and/or calibration is acceptable. For example, with 3D cameras, controller 210 may indicate to head tracker 215 that the 2 cameras or sensing devices, such as a camera and an infrared are not calibrated and parameters need to be shifted in head tracker 215. Similarly, controller 210 may receive data and coordinate with acoustic environment system 220 regarding signals from the audio detection equipment like microphones and accelerometers.

Controller 210 may further recalculate relevant types of information for updates during real time. Controller 210 may receive data from head tracker 210, acoustic environment system 220 and noise cancellation system 205. This data including sound, and motion tracking information may be used in conjunction with each other to determine if the user is moving and how the noise reduction zone should be modified. There may be update variations in calibration based on monitoring and feedback.

Figure 3:
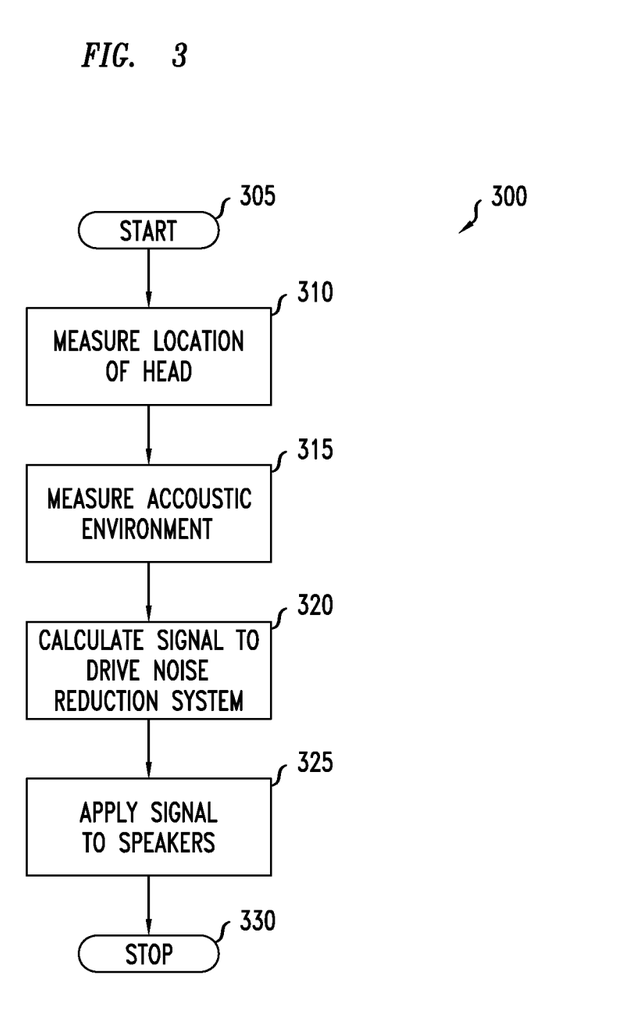
FIG. 3 illustrates a method of producing a noise reduction zone around a user's head.

FIG. 3 illustrates a method of producing a noise reduction zone 300. System 200 may perform method 300. System 200 may begin in block 305 and proceed to block 310 where it may determine user 120's head location. Block 310 may occur as an initialization block, for example, when a user first sits or when the system is turned on. Similarly, location measurement may occur at any time during operation of system 200, such as for example when an update occurs. System 200 may use various types of sensors to track the users head such as a 2D or 3D camera, accelerometers, infrared, ultrasonic, radar, electrostatic, evanescent, lidar, lasers or other location/position sensing means.

Once data is gathered using the head tracking equipment or procedures, system 200 may proceed to block 315 where controller 210 may gather acoustic environment data. Acoustic environment data may be provided by acoustic space system 220. Measurement of acoustic environment data may include initializing and comparing incoming noise data to data tracked in the system.

System 200 may proceed to block 320 where it may calculate an appropriate signal which may be used for noise reduction. Block 320 may occur in both controller 210 and the active noise reduction controller 225. Controller 210 may analyze motion and noise distribution data to notify active noise reduction controller 225 what kind of modifications to the noise area may be made. For example, notification of where the head has shifted to, which may include 3D point clouds may be analyzed and provided to active noise reduction controller 225.

System 200 may then proceed to block 325 when a signal has been produced or modified. Active noise reduction controller 225 may then provide an appropriate noise reduction signal to controller 210 or directly to noise cancellation system 205. System 200 may then proceed to block 330 where it may stop or continue operation from block 305.

Figure 4:
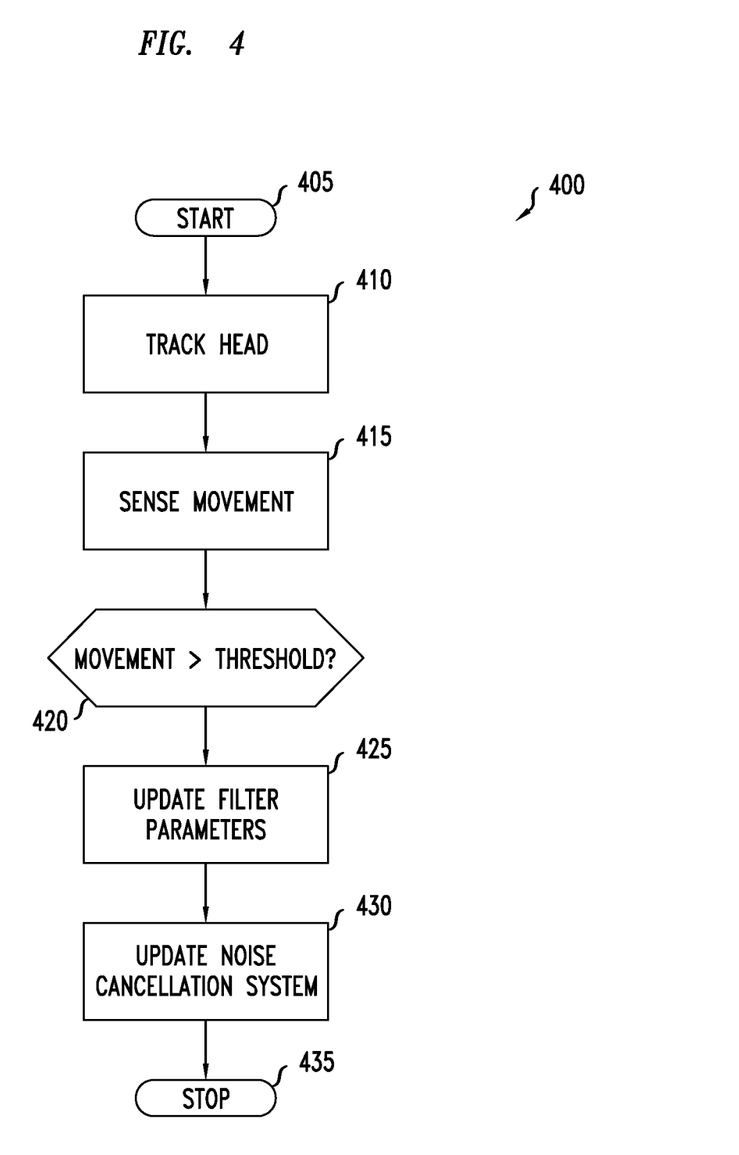
FIG. 4 illustrates an exemplary method of sensing motion associated with producing a noise reduction zone.

FIG. 4 illustrates a method of sensing motion associated with producing a noise reduction zone 400. System 200 may perform method 400. System 200 may begin in block 405 and proceed to block 410 where it may track user 120's head location. Block 410 may occur once system 200 has already been turned on and is active. System 200 may use various types of sensors to track the users head such as a 2D or 3D camera, accelerometers, infrared, ultrasonic, radar, electrostatic, evanescent, lidar, lasers or other location/position sensing means. Pose estimation techniques may be used for tracking the user's head.

System 200 may proceed to block 415 at any time, such as on a given interval where it may determine if there is movement of the head. When system 200 determines that there is movement, it may proceed to block 420 where it may classify the movement. In one example, when the movement is over one threshold it may classify the head as a major shift, such as when a user has bent over. In another example, when movement is over a smaller threshold, system 200 may determine that the active noise reduction controller 225 should be updated and the noise reduction area shifted appropriately.

When system 200 has determined that movement is accurately categorized as over a threshold, system 200 may proceed to block 425. In block 425 system 200 may update configuration parameters of active noise reduction controller 225. The configuration parameters may include filter coefficients as determined by active noise reduction controller 225. Controller 210 may communicate with active noise reduction controller 225 to update the configuration parameters as the head is being tracked.

System 200 may move to block 430 when configuration parameters of active noise reduction controller 225 have been updated where noise cancellation system 205 may be updated. Noise cancellation system may be updated directly by active noise reduction controller 225 or via controller 210. System 200 may then proceed to block 435 where it may stop or continue operation from block 405.

Figure 5:
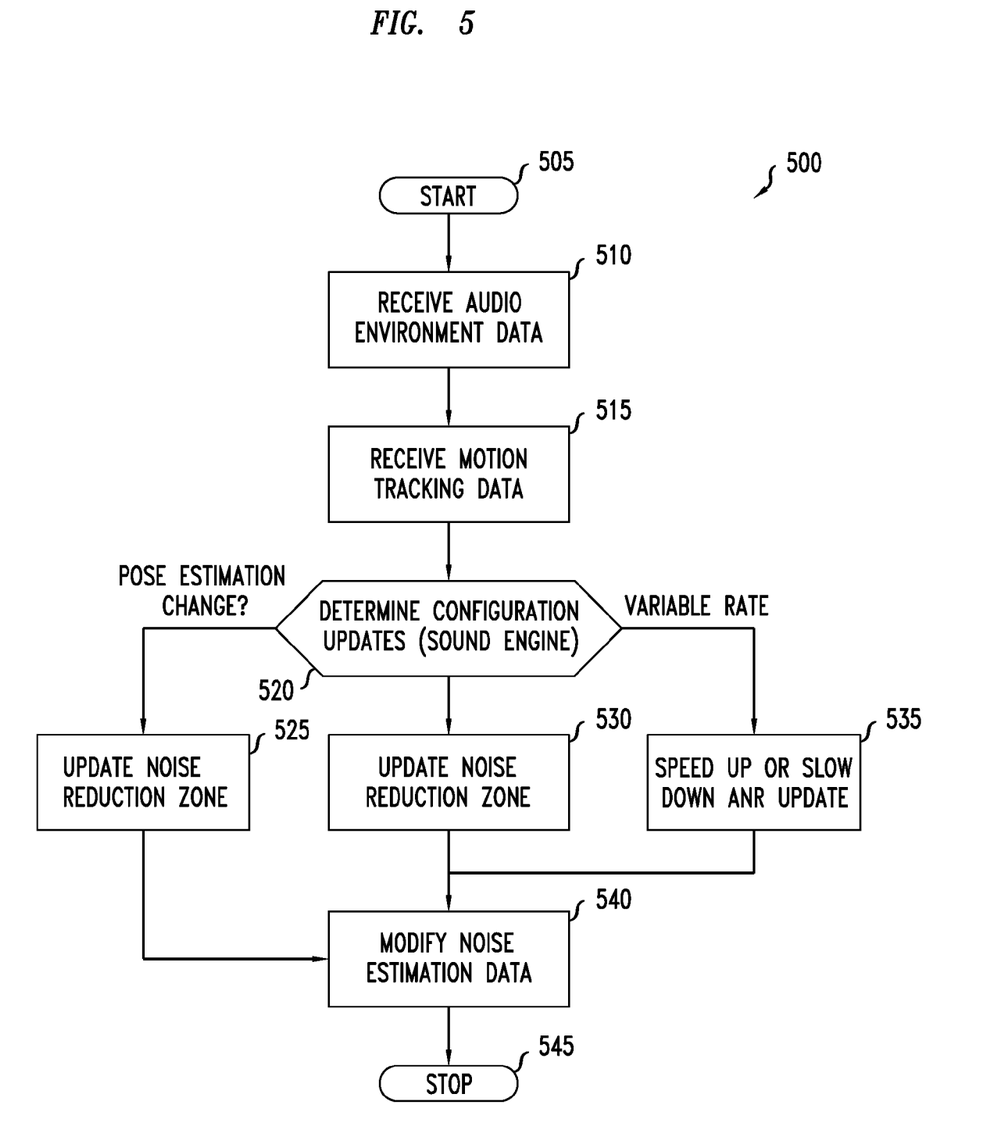
FIG. 5 illustrates another method of sensing motion associated with producing a noise reduction zone.

FIG. 5 illustrates another method of sensing motion associated with producing a noise reduction zone 500. Controller 210 from system 200 may perform method 500. Controller 210 may begin in block 505 and proceed to block 510 where it may receive audio environment data from acoustic environment system 220. Such data may be analyzed to determine if the acoustic environment is changing quickly and requires an increase in the update rate in calculating noise reduction zone.

Controller 210 may proceed to block 515 where it may receive motion tracking data from head tracker 215. Block 515 may occur once system 200 has already been turned on and is active. System 200 may use various types of sensors to track the users head such as a 2D or 3D camera, accelerometers, infrared, ultrasonic, radar, electrostatic, evanescent, lidar, lasers or other location/position sensing means. Pose estimation techniques may be used for tracking the user's head.

Controller 210 may proceed to block 520 where it may determine configuration updates to be supplied to active noise reduction controller 225. In block 520, controller 210 may identify one of a multiple types of changes or system parameters which indicate the necessity of an update. In some embodiments, a pose estimation change may be determined. In other embodiments, an ear axis shift may be detected and identified. In another embodiment, the rate of update of active noise reduction controller 225 may be modified.

When a pose estimation change is detected, controller 210 may proceed to block 525 where it may update the noise reduction zone appropriately. Pose estimation changes may include any of a variety and degree of changes in a user's pose. Similarly, any of a variety of mechanisms, including those mentioned previously, may be used to detect pose estimation changes. Head tracker 215 may be used for pose estimation and change detection. Pose estimation may be detected via a 2D or 3D camera, infrared, ultrasound, laser etc. Edge and corner detection may be used to recognize all or parts of a user's head or figure. Rotated and foreshortened templates may be used for feature detection and tracking. Similarly, small, non-oriented parts may be used for tracking of the head. Eyes, ears, nose, mouth, cheeks, bone structures etc. may all be identified and tracked via various tracking techniques.

In some embodiments, spatial relationships between part locations and co-occurrence of different parts may be used which encode relationships in space. Dependence of global geometry on local appearance may be captured via the tracking devices and associated algorithms. Iterative-closest-point may be used for example. Similarly, direct ray casting may be used by using a sensor or microsensor as a camera. Poses may be tracked and changes detected utilizing contour and correspondence sets. In other embodiments, facial tracking may be used.

Updating of the noise reduction zone may include data being sent to active noise reduction controller 225 such as x, y, z coordinates of where the head has moved to. Similarly, more accurate depictions of the three dimensional data or mapping of the head may be sent. For example, controller 210 may accumulate data, track internally, and then determine that the head mapping is more accurate and indicate to active noise reduction controller 225 that the noise reduction zone should be volumetrically constricted.

Active noise reduction controller 225 may utilize data retrieved from controller 210 to update configuration parameters relevant for the noise reduction zone. Filter coefficients, for example, may be updated.

When an ear axis shift is detected, controller 210 may proceed to block 530 where it may update the noise reduction zone appropriately. Similar communication between controller 210 and active noise reduction controller 225 may occur as in block 530. Head tracker 215 may determine a plane defining an axis between the ears of a user. Ear axis data and/or coordinates may be stored in a memory module such as a database or a table. Data may be stored at different rates such as 200 milliseconds or 1 second. Controller 210 may at any time determine which tracking mechanism should be used and turned on, including pose estimation and ear axis tracking. The noise reduction zone may be adjusted by location and size according to the changes and shifts in the ear axis.

When an event which indicates the update rate should be modified, controller 210 may proceed to block 535 where it may update the noise reduction zone appropriately. Similar communication between controller 210 and active noise reduction controller 225 may occur as in block 525. For example, when a user's head is indicated toward a major shift, such as when a person bends down suddenly, the update rate may be slowed or paused as the user has moved out of the zone of noise cancellation. Similarly, the rate may be increased when a user's head is shifting slightly. Further, the update rate may be further adjusted by changes in the acoustic environment, as well.

Controller 210 may proceed to block 540 where noise cancellation system 205 may be updated. Speakers, amplifiers, and circuits comprising noise cancellation system 205 may shift their angle or tilt depending on whether the user's head has moved. Similarly, different frequencies and amplitudes may be projected depending on the change in the acoustic environment and zone of noise reduction.

Controller 210 may then proceed to block 545 where it may stop or continue operation from block 505.

It should be apparent from the foregoing description that various exemplary embodiments of the disclosure may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be affected while remaining within the spirit and scope of the invention. Accordingly, the foregoing disclosure, description, and figures are for illustrative purposes only and do not in any way limit the invention, which is defined only by the claims.

What is claimed is:

1. A method of updating a noise cancelling distribution area, the method comprising:
   measuring a location of a user's head;
   measuring an acoustic environment surrounding the user with at least one sensor to produce sound data;
   providing the sound data to determine active noise reduction controller configuration parameters for the noise cancelling distribution area;
   generating at least one active noise reduction control from the active noise reduction controller configuration parameters;
   updating the active noise reduction controller configuration parameters at a specified rate and modifying a level of the specified rate based on an event in the noise cancelling distribution area; and
   applying the at least one active noise reduction control to create the noise cancelling distribution area around the user's ear with at least one speaker.

2. The method of claim 1 further comprising:
   determining a shift in the user's head; and
   when the shift is greater than a threshold, updating the active noise reduction controller configuration parameters such that the user's ears remain within the noise cancelling distribution area.

3. The method of claim 2 further comprising:
   using iterative closest point to track and determine a shift in the user's head.

4. The method of claim 1 further comprising:
   tracking a planar axis connecting the user's ears of the user's head to determine shifts in the user's head.

5. The method of claim 1 wherein the active noise reduction controller configuration parameters are filter parameters for the noise cancelling distribution area.

6. The method of claim 1 further comprising:
   using pose estimation to identify and track the location and an orientation of the users head.

7. The method of claim 1 further comprising:
   applying a produced signal to adjust multiple speakers as the user's head adjusts accordingly.

8. The method of claim 1 further comprising:
   modifying the level of the specified rate based upon movement of the location of the user's head.

9. The method of claim 1 further comprising:
   modifying the level of the specified rate based upon changes in the acoustic environment.

10. A device for noise cancelling including a method of updating a noise cancelling distribution area comprising:
    a memory;
    a processor to:
       measure a location of a user's head;
       measure an acoustic environment surrounding the user with at least one sensor to produce sound data;
       providing the sound data to determine active noise reduction controller configuration parameters for the noise cancelling distribution area;
       generate at least one active noise reduction control from the active noise reduction controller configuration parameters;
       update the active noise reduction controller configuration parameters at a specified rate and modify a level of the specified rate based on an event in the noise cancelling distribution area; and
       apply the at least one active noise reduction control to create the noise cancelling distribution area in a region around the user's ear with at least one speaker.

11. The device of claim 10 wherein the processor further:
    determines a shift in the user's head; and
    when the shift is greater than a threshold, updates the active noise reduction controller configuration parameters such that the user's ears remain within the noise cancelling distribution area.

12. The device of claim 11 wherein the processor further:
    uses iterative closest point to track and determine a shift in the user's head.

13. The device of claim 10 wherein the processor further:
    tracks a planar axis connecting the user's ears of the user's head to determine shifts in the user's head.

14. The device of claim 10 wherein the active noise reduction controller configuration parameters are filter parameters for the noise cancelling distribution area.

15. The device of claim 10 wherein the processor further:
    uses pose estimation to identify and track the location and an orientation of the users head.

16. The device of claim 10 wherein the processor further:
    applies a produced signal to adjust multiple speakers as the user's head adjusts.

17. The device of claim 10 wherein the processor further:
    modifies the level of the specified rate based upon movement of the location of the user's head.

18. The device of claim 10 wherein the processor further: modifies the level of the specified rate based upon changes in the acoustic environment.

\* \* \* \* \*